United States Patent
Ishishita et al.

(10) Patent No.: US 10,220,720 B2
(45) Date of Patent: Mar. 5, 2019

(54) POWER SUPPLY SYSTEM FOR VEHICLE

(71) Applicant: TOYOTA JIDOSHA KABUSHIKI KAISHA, Toyota-shi, Aichi-ken (JP)

(72) Inventors: Teruo Ishishita, Miyoshi (JP); Ryo Mano, Toyota (JP); Hiroyuki Obata, Nagoya (JP); Takashi Ogura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 15/211,287

(22) Filed: Jul. 15, 2016

(65) Prior Publication Data

US 2017/0028867 A1 Feb. 2, 2017

(30) Foreign Application Priority Data

Jul. 30, 2015 (JP) ................................. 2015-150800

(51) Int. Cl.
*H02J 7/00* (2006.01)
*B60L 11/18* (2006.01)

(52) U.S. Cl.
CPC .......... *B60L 11/1861* (2013.01); *H02J 7/007* (2013.01); *H02J 7/0077* (2013.01)

(58) Field of Classification Search
CPC ...... B60L 11/1861; H02J 7/007; H02J 7/0077
USPC ............... 320/109, 132, 151, 152, 159, 164; 701/22; 180/65.29
See application file for complete search history.

(56) References Cited

U.S. PATENT DOCUMENTS

| | | | | |
|---|---|---|---|---|
| 5,606,242 A | * | 2/1997 | Hull | H02J 7/0004 320/106 |
| 6,621,250 B1 | * | 9/2003 | Ohkubo | G01R 31/3613 320/136 |
| 2006/0022643 A1 | * | 2/2006 | Brost | G01R 31/3648 320/132 |
| 2010/0153038 A1 | | 6/2010 | Tomura et al. | |
| 2010/0318252 A1 | * | 12/2010 | Izumi | B60K 6/365 701/22 |
| 2013/0151180 A1 | | 6/2013 | Koch | |

FOREIGN PATENT DOCUMENTS

| | | |
|---|---|---|
| DE | 102012110550 A1 | 6/2013 |
| EP | 2691254 B1 | 9/2016 |
| JP | 2005-037286 A | 2/2005 |

(Continued)

*Primary Examiner* — Zixuan Zhou
(74) *Attorney, Agent, or Firm* — Oliff PLC

(57) ABSTRACT

A power supply system includes a controller. The controller is configured to; a) control charging and discharging of an electrical storage device upon reception of an output of a current sensor and a voltage sensor, b) calculate a control current value by subtracting an offset value from a detected value of the current sensor, c) calculate a first determination result and a second determination result, respectively obtained by determining whether the electrical storage device is being charged or discharged based on the control current value, and based on a change in a remaining amount of charge of the electrical storage device, and d) when the first determination result and the second determination result differ from each other, change the offset value such that the first determination result coincides with the second determination result.

5 Claims, 7 Drawing Sheets

(56) References Cited

FOREIGN PATENT DOCUMENTS

| JP | 2005-100682 A | 4/2005 |
|---|---|---|
| JP | 2007-003452 A | 1/2007 |
| JP | 2008-241246 A | 10/2008 |
| JP | 2011-512784 A | 4/2011 |
| WO | 2009/094367 A1 | 7/2009 |

\* cited by examiner

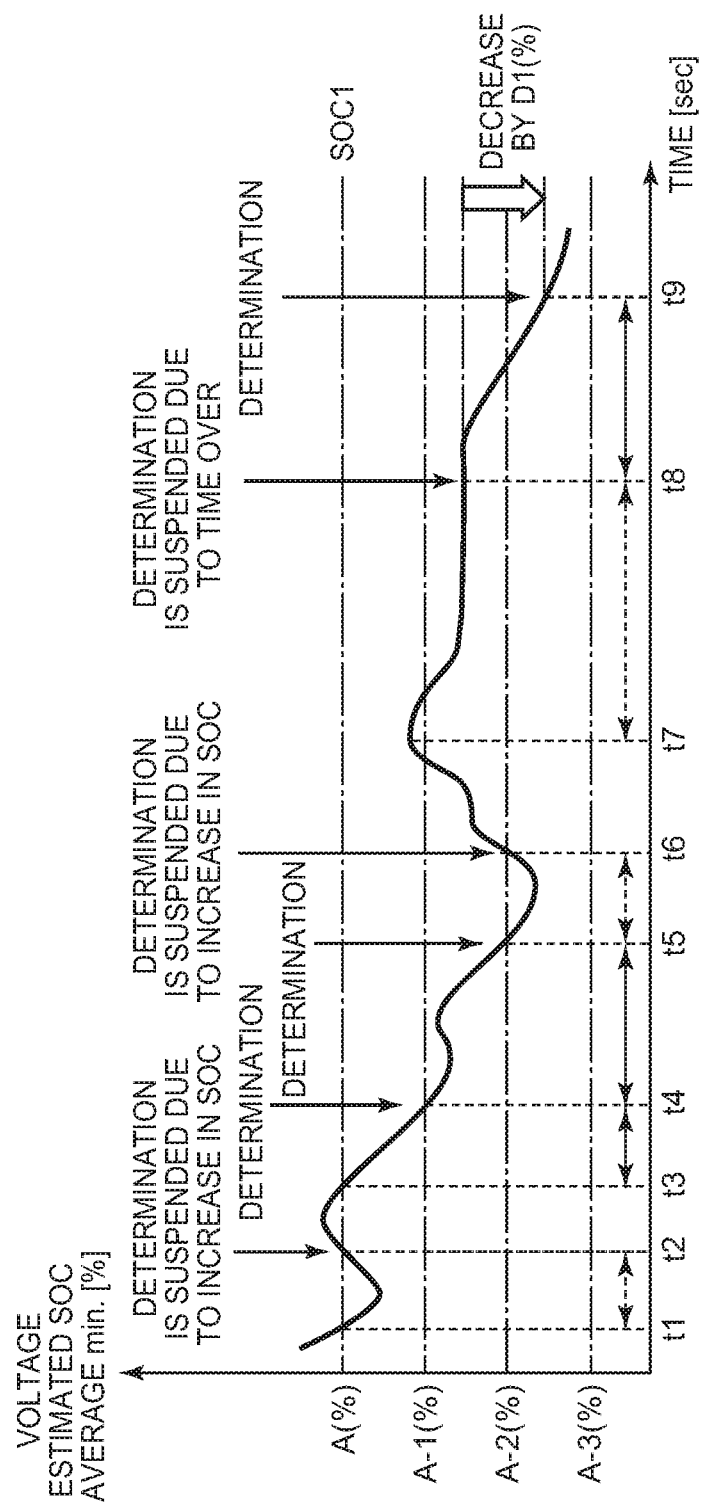

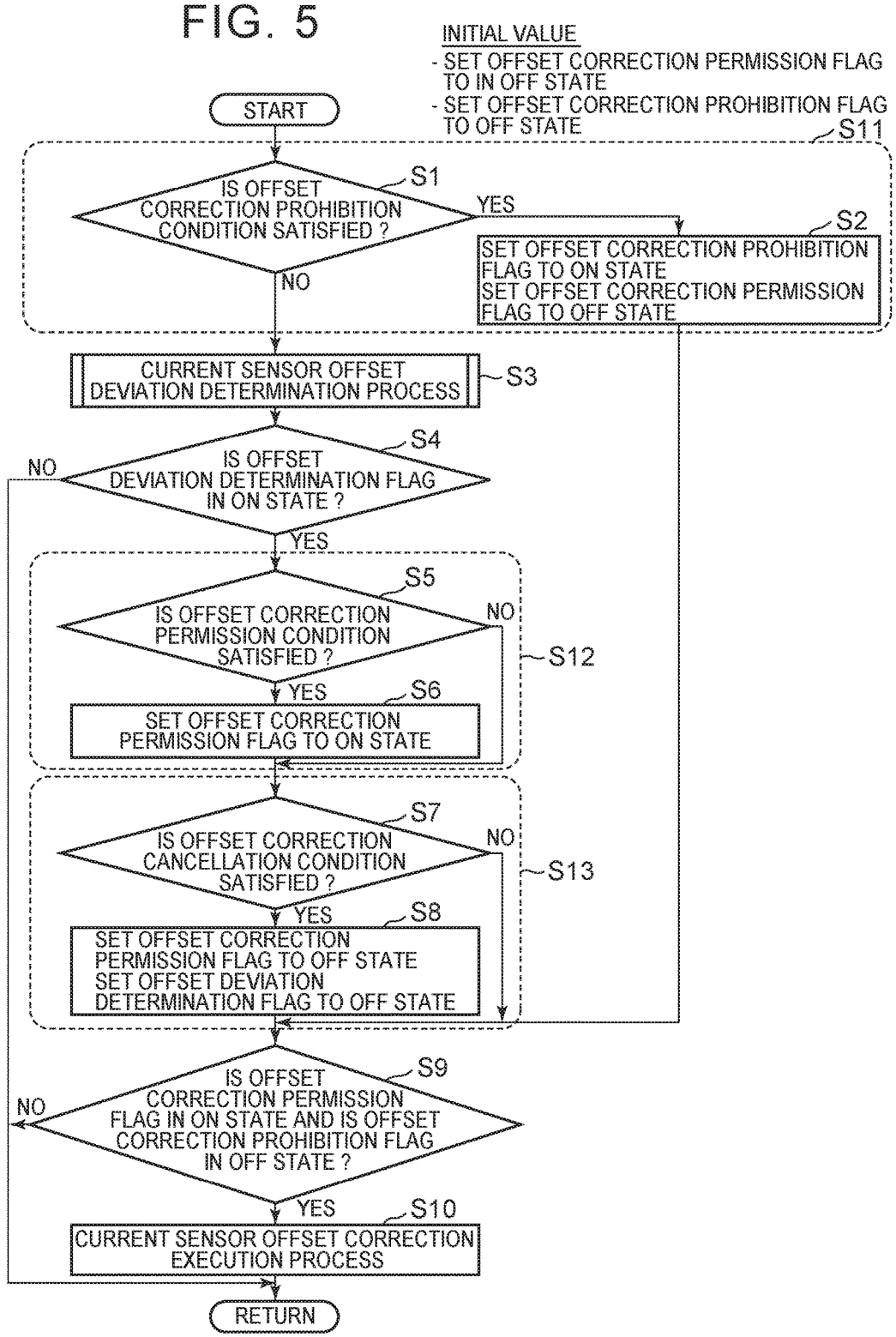

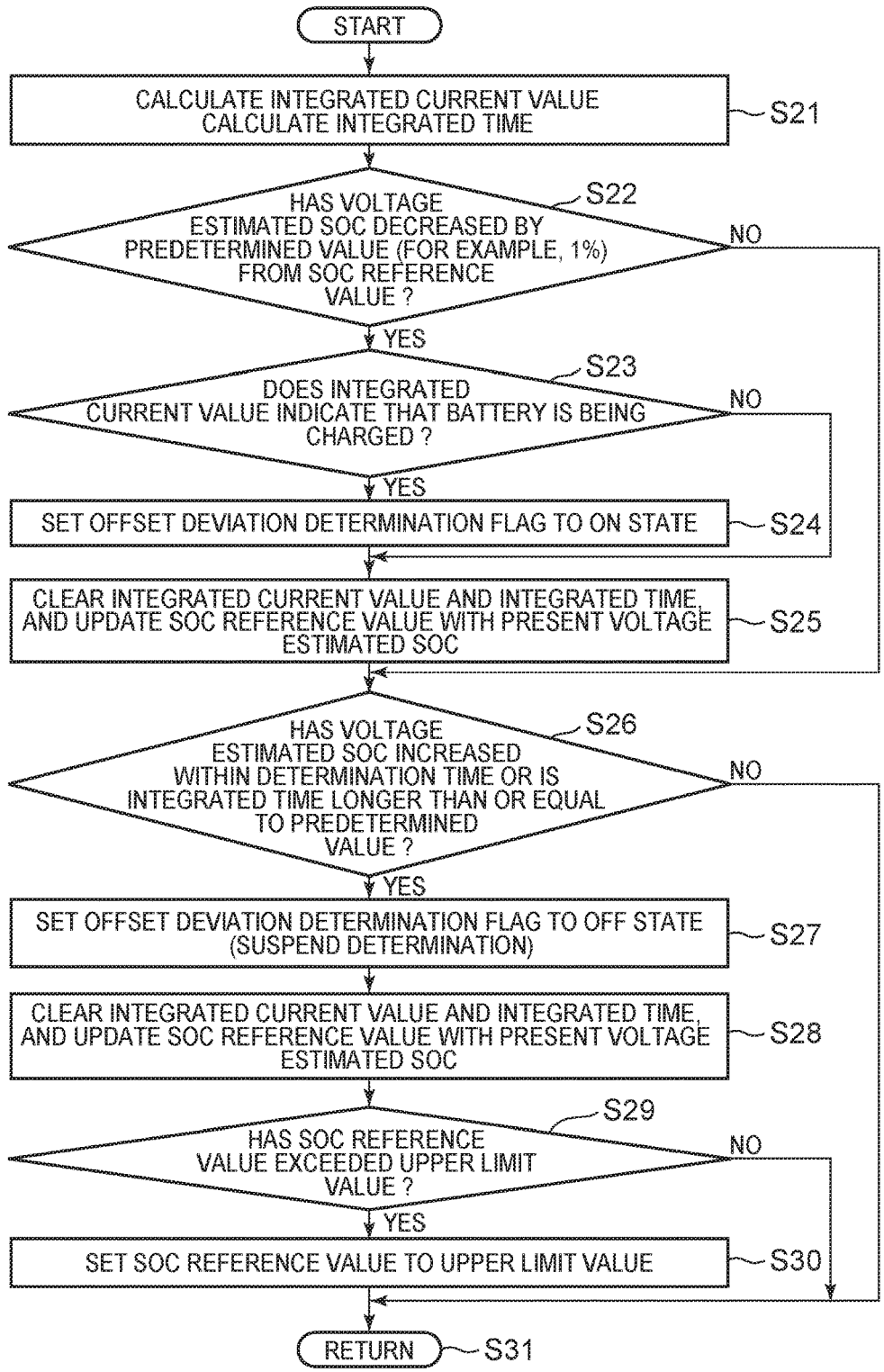

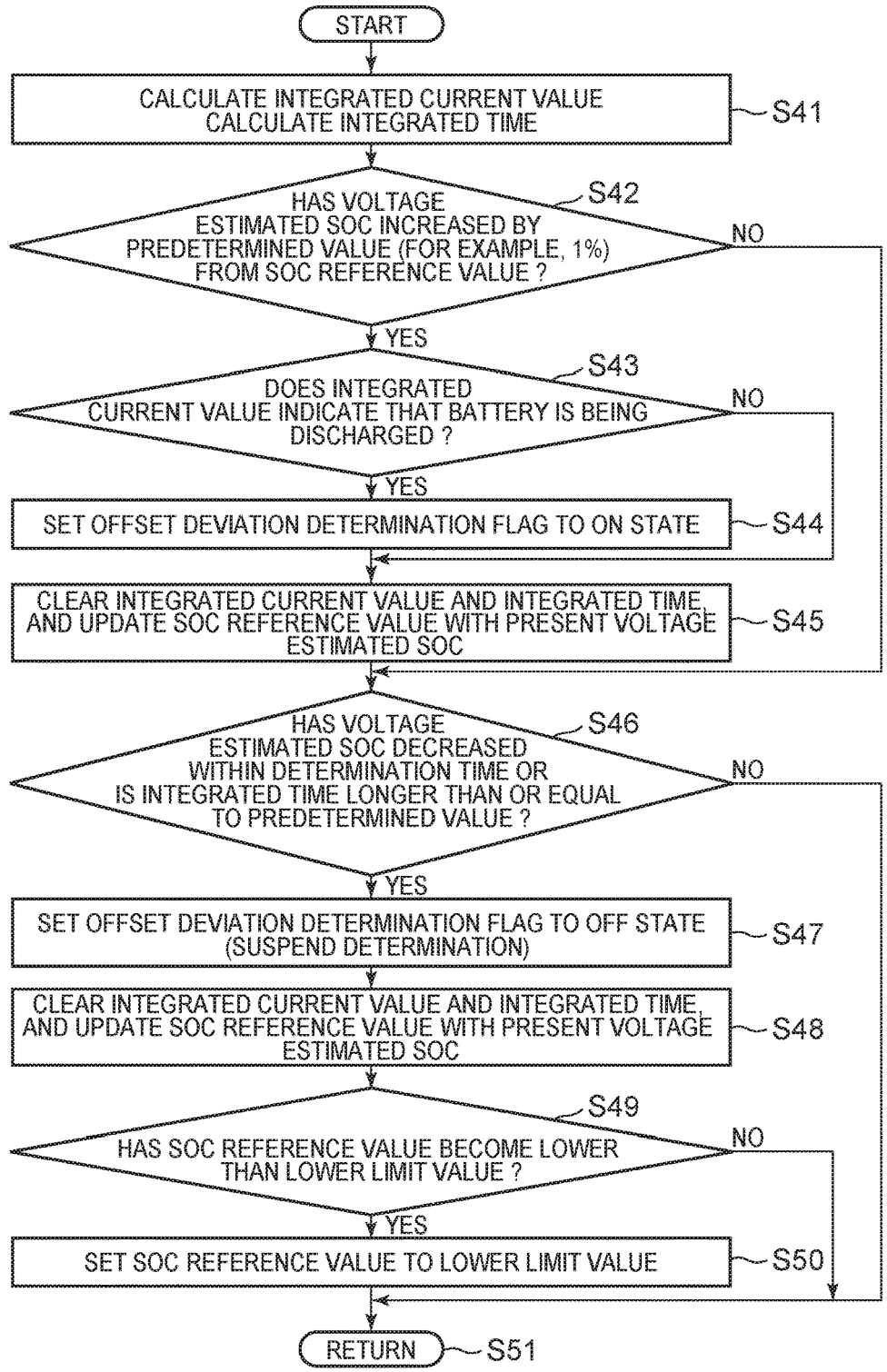

POWER SUPPLY SYSTEM FOR VEHICLE

INCORPORATION BY REFERENCE

The disclosure of Japanese Patent Application No. 2015-150800 filed on Jul. 30, 2015 including the specification, drawings and abstract is incorporated herein by reference in its entirety.

BACKGROUND

1. Technical Field

The disclosure relates to a power supply system for a vehicle and, more particularly, to a power supply system including a current sensor that detects a charge and discharge current of an electrical storage device.

2. Description of Related Art

Generally, an auxiliary battery is mounted on a vehicle, and a high-voltage battery that supplies electric power to a drive motor is further mounted on an electric vehicle, a hybrid vehicle, or the like. In order to control charging and discharging of such a battery, a current of the battery is detected by a current sensor.

Japanese Patent Application Publication No. 2005-037286 (JP 2005-037286 A) describes that an offset error is detected based on a detected value of a current sensor just after an ignition key switch has switched from an on state to an off state and is stored, and a detected value of the current sensor is corrected by using a correction value (offset value) corresponding to the stored offset error. The offset error is an error that a detected value of the current sensor indicates a value other than zero although a true value is zero. The offset error is corrected by subtracting the correction value (offset value) corresponding to the offset error of the current sensor from a detected value of the current sensor.

In the method of correcting a detected value of a current sensor by using a stored offset value as described in JP 2005-037286 A, even when an offset value is stored at startup of a vehicle and a detected value of the current sensor is corrected based on the stored offset value, an actual offset error of the current sensor can change as a result of a rise in the temperature of the current sensor thereafter. Therefore, there is a concern that a deviation arises between the stored offset value and the actual offset error and, as a result, overcharging or overdischarging of a battery occurs.

If there is a deviation in correcting an offset error, this deviation significantly influences charge and discharge control at a small electric power. For example, an allowable charge/discharge power of a battery needs to be limited to a small value at an extremely low temperature, so the battery is charged or discharged at a small electric power.

If there is a deviation in correcting an offset error of the current sensor that monitors the current of the battery while such charge and discharge control at a small electric power is being executed, it is presumable that an electronic control unit (ECU) that determines whether the battery is being charged or discharged based on a corrected detected value of the current sensor may recognize that the battery is being charged although the battery is actually being discharged. If this state continues for a long time, the state of charge (SOC) of the battery decreases, and there is a concern that overdischarging of the battery occurs at last.

On the other hand, it is also conceivable that the ECU recognizes that the battery is being discharged although the battery is actually being charged. In this case, there is a concern about overcharging of the battery.

SUMMARY

The disclosure provides a power supply system for a vehicle, which is able to improve the accuracy of correcting an offset error of a current sensor that monitors a current of a battery.

A power supply system for a vehicle according to this disclosure includes: an electrical storage device; a current sensor configured to detect a charge and discharge current of the electrical storage device; a voltage sensor configured to detect a voltage of the electrical storage device; and a controller configured to control charging and discharging of the electrical storage device upon reception of an output of the current sensor and an output of the voltage sensor. The controller is configured to calculate a control current value by subtracting an offset value from a detected value of the current sensor. The control current value is a value that is used in control that is executed by the controller. The controller is configured to calculate a first determination result and a second determination result. The first determination result is obtained by determining whether the electrical storage device is being charged or discharged based on the control current value. The second determination result is obtained by determining whether the electrical storage device is being charged or discharged based on a change in a remaining amount of charge of the electrical storage device. The remaining amount of charge is calculated based on the output of the voltage sensor. The controller is configured to, when the first determination result and the second determination result differ from each other, execute a process of changing the offset value such that the first determination result coincides with the second determination result.

The remaining amount of charge (SOC) of the electrical storage device is calculated based on the output of the voltage sensor, so, even when there is an offset error in the control current value of the current sensor, the remaining amount of charge (SOC) of the electrical storage device mostly changes in a correct direction (increases during charging and decreases during discharging). For this reason, when the second determination result determined based on a change in the SOC of the electrical storage device does not coincide with the first determination result determined based on the control current value of the current sensor, the controller determines that there is an offset error in the control current value of the current sensor, and executes the process of changing the offset value that is used in correcting the offset error of the current sensor such that the first determination result coincides with the second determination result.

The SOC may be calculated based on both the output of the voltage sensor and the output of the current sensor. In this case as well, when the result obtained by determining whether the electrical storage device is being charged or discharged based on only the output of the current sensor does not coincide with the result obtained by determining whether the electrical storage device is being charged or discharged based on a change in the SOC, there is a high possibility that correction of the offset error of the current sensor is not correct. Therefore, by changing the offset value that is used in correcting the offset error, the controller is allowed to correctly determine whether the electrical storage device is being charged or discharged.

The controller may be configured to, when the remaining amount of charge of the electrical storage device is higher than a predetermined value, not execute the process of changing the offset value, and, when the remaining amount of charge of the electrical storage device is lower than the predetermined value, execute the process of changing the offset value.

By executing the above-described control, the offset value is changed only when the SOC of the electrical storage device is close to a management lower limit value and the offset error of the current sensor leads to overdischarging. For this reason, unnecessary correction process is omitted, so a slow processing speed of the controller 80 is prevented.

The controller may be configured to, when the first determination result indicates that the electrical storage device is being charged and the second determination result indicates that the electrical storage device is being discharged, change the offset value such that a charge current value is reduced.

By executing control as described above, the first determination result changes so as to indicate that the electrical storage device is being discharged, so the detected value of the current sensor is corrected to a correct side.

The controller may be configured to, when the remaining amount of charge of the electrical storage device is lower than a predetermined value, not execute the process of changing the offset value, and, when the remaining amount of charge of the electrical storage device is higher than the predetermined value, execute the process of changing the offset value.

By executing control as described above, the offset value is changed only when the SOC of the electrical storage device is close to a management upper limit value and the offset error of the current sensor leads to overcharging. For this reason, unnecessary correction process is omitted, so a slow processing speed of the controller 80 is prevented.

The controller may be configured to, when the first determination result indicates that the electrical storage device is being discharged and the second determination result indicates that the electrical storage device is being charged, change the offset value such that a discharge current value is reduced.

By executing control as described above, the first determination result changes so as to indicate that the electrical storage device is being charged, and the detected value of the current sensor is corrected to a correct side.

According to the disclosure, the offset value that is used in correcting the offset error of the current sensor that measures the current of the electrical storage device is changed to a correct side, so, even when the offset error of the current sensor fluctuates after startup of the vehicle, it is possible to prevent overcharging or overdischarging of the electrical storage device.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a waveform chart that shows a state where the SOC of a battery changes near a lower limit value;

FIG. 5 is a flowchart for illustrating the process of correcting a control current value of a current sensor;

FIG. 6 is a flowchart for illustrating the details of the process of determining an offset deviation of the current sensor in step S2 of FIG. 5; and FIG. 7 is a flowchart for illustrating the process of determining an offset deviation according to an alternative embodiment.

DETAILED DESCRIPTION OF EMBODIMENTS

Figure 1:
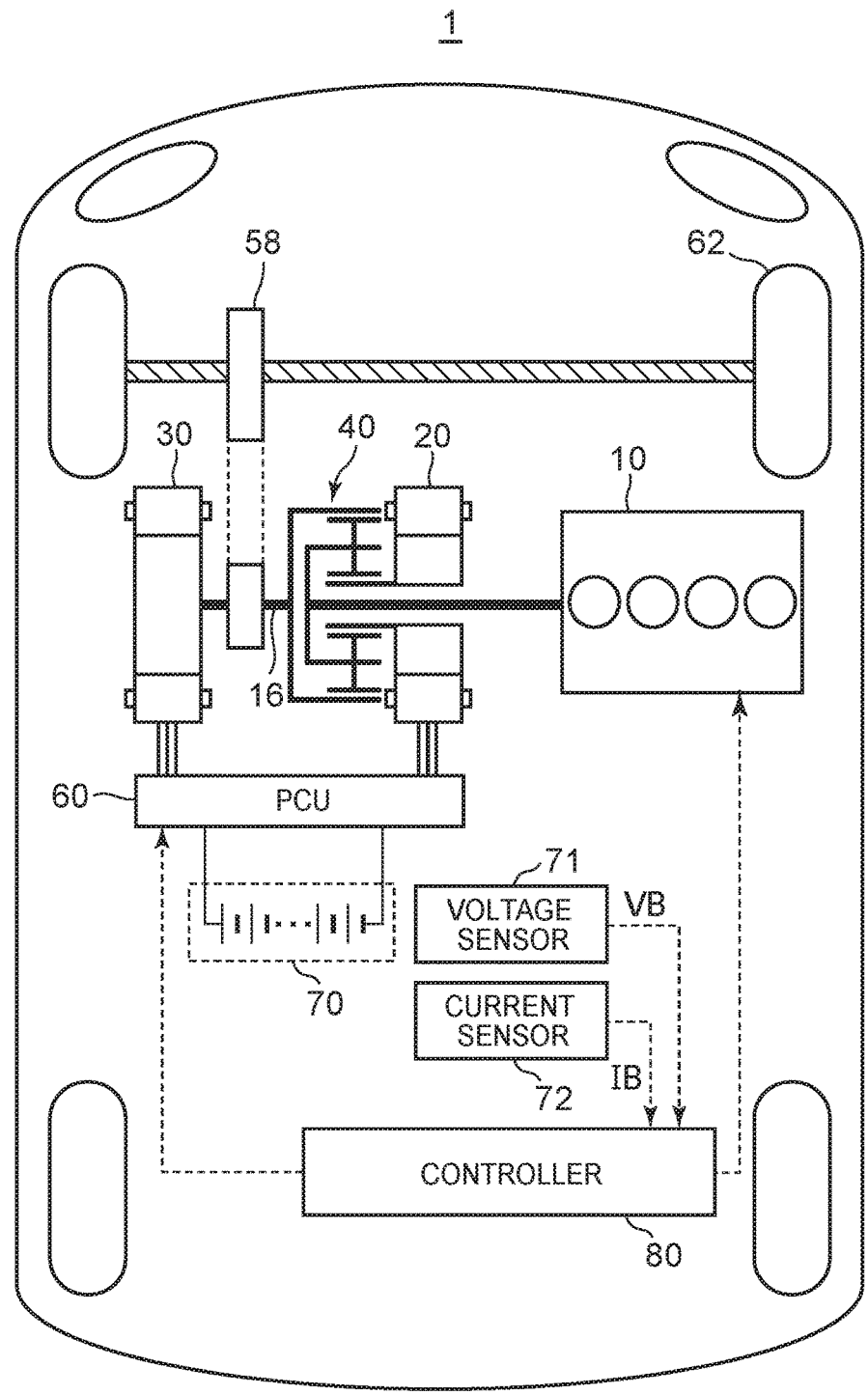
FIG. 1 is a block diagram that shows the configuration of a hybrid vehicle.

Hereinafter, an embodiment will be described in detail with reference to the accompanying drawings. Like reference numerals denote the same or corresponding portions in the drawings, and the description thereof will not be repeated.

FIG. 1 is a block diagram that shows the configuration of a hybrid vehicle 1 to which the disclosure is applied. As shown in FIG. 1, the hybrid vehicle 1 includes an engine 10, motor generators 20, 30, a power split mechanism 40, a reduction mechanism 58, drive wheels 62, a power control unit (PCU) 60, a battery 70, a voltage sensor 71, a current sensor 72, and a controller 80.

The hybrid vehicle 1 is a series-parallel hybrid vehicle, and is configured to be able to travel by using at least one of the engine 10 and the motor generator 30 as a drive source.

The engine 10, the motor generator 20 and the motor generator 30 are coupled to one another via the power split mechanism 40. The reduction mechanism 58 is connected to a rotary shaft 16 of the motor generator 30. The rotary shaft 16 is coupled to the power split mechanism 40. The rotary shaft 16 is coupled to the drive wheels 62 via the reduction mechanism 58, and is coupled to a crankshaft of the engine 10 via the power split mechanism 40.

The power split mechanism 40 is able to distribute the driving force of the engine 10 between the motor generator 20 and the rotary shaft 16. The motor generator 20 is able to function as a starter for starting the engine 10 by rotating the crankshaft of the engine 10 via the power split mechanism 40.

Each of the motor generators 20, 30 is a known synchronous generator motor that can operate as not only a generator but also an electric motor. The motor generators 20, 30 are connected to the PCU 60. The PCU 60 is connected to the battery 70.

The controller 80 is connected to the PCU 60, and controls the driving of the motor generators 20, 30. The controller 80 is connected to the engine 10. The controller receives signals from various sensors that detect the operating state of the engine 10, and executes operation control, such as fuel injection control, ignition control and intake air amount adjustment control, in response to the received signals.

In the above-described vehicle, a power supply system for a vehicle includes the battery 70, the voltage sensor 71, the current sensor 72 and the controller 80. Hereinafter, charge and discharge control over the battery 70, which is executed in the power supply system for a vehicle, will be described in more details.

The controller 80, for example, calculates a required power that is required to propel the vehicle based on a depression amount of an accelerator pedal, a vehicle speed, and the like, and basically controls the engine 10 such that the required power is output from the engine 10. Part of power output from the engine is used by the motor generator 20 to generate electric power. Generated electric power is used by the motor generator 30, and driving force is generated in the reduction mechanism 58. The other part of power output from the engine is directly transmitted to the reduction mechanism 58 via the power split mechanism 40. In this case, basically, the SOC of the battery 70 does not increase or decrease.

However, in the hybrid vehicle, in order to improve fuel economy, the engine is stopped at the time when the vehicle travels at a low speed, for example, when the vehicle starts moving, or when the vehicle is stopped, and the engine is intermittently operated. When the vehicle travels in motor drive mode in an engine stopped state or when cranking for restarting the engine 10 is performed, the battery 70 is discharged, so the SOC decreases. During braking, regenerative braking is performed by the motor generator 30, and electric energy is recovered by the battery 70, so the SOC of the battery 70 increases.

In order to manage the SOC of the battery 70, which fluctuates due to such factors, within a set range, the controller 80 increases or reduces the required power. The required power is also increased or reduced in order to compensate for electric power that is used in auxiliaries.

In order to determine an increasing or reducing value of the required power, the controller 80 needs to accurately recognize in which state the battery 70 is placed, a charged state or a discharged state. The controller 80 computes a charge/discharge power of the battery 70 by using the product of a detected value of the voltage sensor 71 and a detected value of the current sensor 72. The detected value of the voltage sensor 71 is the voltage of the battery 70. Therefore, the sign of the detected value is constantly plus. Incidentally, the detected value of the current sensor 72 is plus during discharging, and minus during charging. The sign of the detected value reverses occasionally. If the sign of the detected value of the current sensor 72 is wrong, the controller 80 recognizes that the battery 70 is being charged although the battery 70 is actually being discharged or recognizes that the battery 70 is being discharged although the battery 70 is actually being charged.

When the magnitude of the required power is small, the magnitude of the detected value of the current sensor 72 is also small. Therefore, if there is an offset error, the sign reverses. Particularly, at an extremely low temperature, the charge/discharge power of the battery 70 is limited to a small value as a result of reducing the allowable input for the purpose of protecting the battery 70, so this inconvenience is remarkable. This will be described with reference to the conceptual views shown in FIG. 2 and FIG. 3. The controller 80 uses a control current value (current value that is used in control), which is determined based on the following mathematical expression, in charge and discharge control over the battery 70.

Control current value=(Detected value of the current sensor 72)−(Offset correction value)

In the following description, the detected value of the current sensor 72 means a value obtained by converting the output of the current sensor 72 without correction, and the control current value of the current sensor 72 means a corrected current value obtained by subtracting an offset correction value, stored in the controller 80, from the detected value of the current sensor 72 as described in the above mathematical expression.

Offset correction means that a detected value of the current sensor 72 is corrected or updated with an offset correction value stored in the controller 80.

Figure 2:
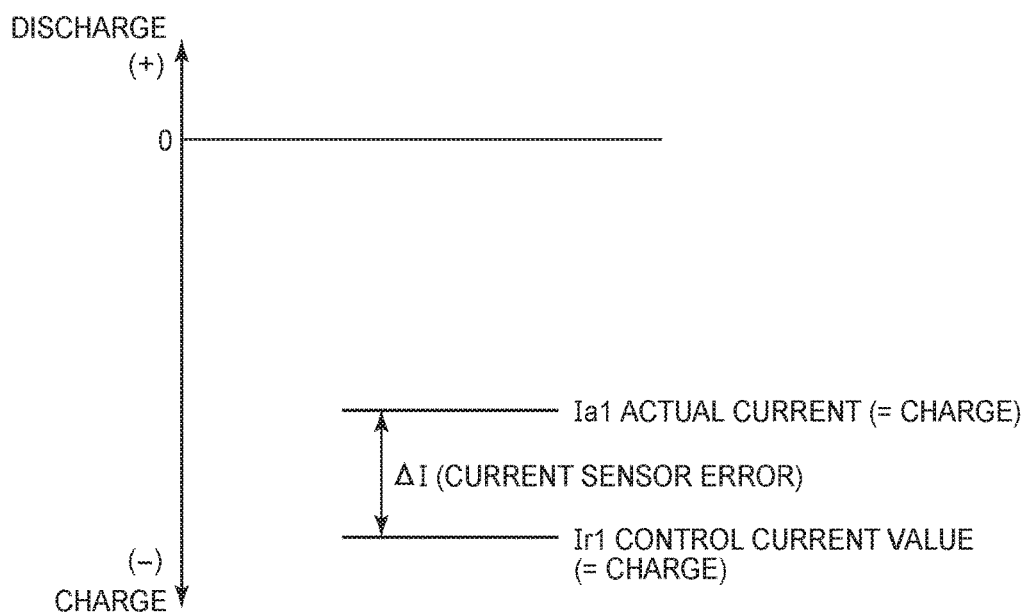
FIG. 2 is a conceptual view that shows a state where a control current value is correctly recognized as charging even when there is an offset corresponding to a current sensor error.

FIG. 2 is a conceptual view that shows a state where it is correctly recognized that the battery 70 is being charged based on the control current value even when there is an offset corresponding to a current sensor error in the case where an allowable charge power is large and the battery 70 is charged at a relatively large charge current. On the other hand, FIG. 3 is a conceptual view that shows a state where it is erroneously recognized that the battery 70 is being charged based on the control current value because of an offset corresponding to a current sensor error although the battery 70 is actually being discharged as a result of the fact that an allowable charge power is limited and the battery 70 is charged at a relatively small charge current.

Figure 3:
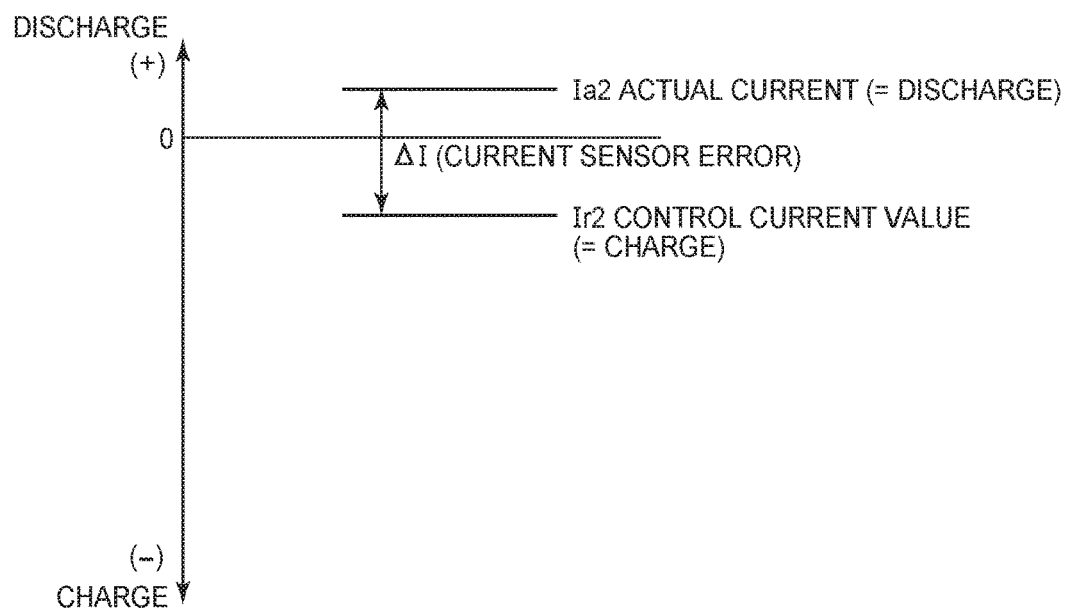
FIG. 3 is a conceptual view that shows a state where a control current value is erroneously recognized as charging due to an offset corresponding to a current sensor error although discharging is actually being performed.

FIG. 2 and FIG. 3 show the case where offset correction according to the present embodiment is not applied and a detected value of the current sensor 72 is directly used as the control current value. There is a deviation ($\Delta I = Ia1 - Ir1$) between an actual current Ia1 that is actually input to the battery 70 and a control current value Ir1 (=a current that is detected by the current sensor) in FIG. 2. As shown in FIG. 2, when an allowable charge power Win is sufficiently large (for example, at ordinary temperature), the actual current Ia1 and the control current value Ir1 are away from zero.

As the temperature decreases from the state shown in FIG. 2 to an extremely low temperature, the allowable charge power Win is reduced (brought close to zero). As a result, as shown in FIG. 3, an actual current Ia2 is closer to zero than the actual current Ia1 shown in FIG. 2. At this time, if it is assumed that the deviation $\Delta I$ is equal, the control current value Ir2 (=a current that is detected by the current sensor) and actual current Ia2 shown in FIG. 3 are values obtained by respectively translating the control current value Ir1 and actual current Ia1 shown in FIG. 2 toward the discharge side by the same amount.

As a result, in FIG. 2, both the sign of the current Ir1 and the sign of the actual current Ia1 are minus and indicate that the battery 70 is being charged; whereas, in FIG. 3, the sign of the current Ir2 is minus and indicates that the battery 70 is being charged, and the sign of the actual current Ia2 is plus and indicates that the battery 70 is being discharged.

That is, in FIG. 3, the controller 80 recognizes that the battery 70 is being charged because the control current value Ir2 indicates that the battery 70 is being charged, while the SOC of the battery 70 gradually decreases because the actual current Ia2 indicates that the battery 70 is being discharged. As such a state continues for a long time, there is a concern about depletion of the battery 70.

In the present embodiment, when the charge/discharge power is small and the influence of an offset error is large, the offset error is repeatedly corrected, and the control current value of the current sensor 72 is updated.

Specifically, the fact that the following condition is satisfied is used as a trigger to execute offset correction process over the current sensor 72. The condition is that the SOC of the battery 70 is close to or lower than or equal to a usage lower limit SOC, the sign of the current IB that is the control current value of the current sensor 72 is minus and indicates that the battery 70 is being charged, while the SOC of the battery 70 decreases and indicates that the battery 70 is being discharged.

In this case, the controller 80 computes the SOC based on, mainly, the voltage VB detected by the voltage sensor 71.

For example, a method described in Japanese Patent Application Publication No. 2008-241246 (JP 2008-241246 A) may be used as such a method of computing the SOC. A method of computing the SOC is not limited to this method. The method may use the detected value of the current sensor 72 in addition to the voltage VB detected by the voltage sensor 71. That is, because it is presumable that the SOC changes in a correct direction even when there is an offset error in the current sensor 72 as a result of consideration of the detected value of the voltage sensor 71, the case where a change in the SOC does not coincide with the sign of the current IB may be used as a trigger to execute correction process.

When the above trigger condition is satisfied, the controller 80 corrects the control current value of the current sensor 72 to a discharge recognition side, that is, in an increasing direction. Correction at this time is performed by further adding a correction value δi to a present offset correction value that is stored in the internal memory of the controller 80 for the purpose of correcting the detected value of the current sensor 72. The correction value δi may be set to a value determined in advance based on the temperature characteristics of the current sensor 72 and current detection circuit. For example, the maximum width in which the offset of the current sensor 72 changes may be measured in advance in the case where there is a temperature change within a predetermined range, and the maximum width or a value obtained by dividing the maximum width may be used as the correction value δi. As an example, the correction value δi may be set to a fixed value close to zero like δi=−0.4 (A).

In a state where there is no concern about battery depletion, for example, when the SOC of the battery 70 has a sufficient allowance for the lower limit value, when the voltage of the battery 70 is higher than or equal to a predetermined value or when the battery temperature is higher than or equal to a predetermined value, the above-described correction may not be performed or the correction may be cancelled for the purpose of preventing overcharging of the battery 70.

Next, an example of the timing at which it is determined whether to perform correction will be described with reference to the waveform chart.

FIG. 4 is a waveform chart that shows a state where the SOC of the battery 70 changes near the lower limit value. When the SOC of the battery 70 has decreased to a predetermined value SOC1 close to the SOC lower limit value, the controller 80 starts the process of determining whether there is an offset deviation of the current sensor 72 when the value of the SOC has decreased by the predetermined value D1.

For the sake of easy understanding, an example in which a predetermined value SOC close to the SOC lower limit value is A (%) and the predetermined value D1 is 1% is shown in FIG. 4.

Referring to FIG. 1 and FIG. 4, before time t1, the SOC of the battery 70 is higher than A (%), so the necessity of concern about battery depletion is small. For this reason, it is not determined whether there is an offset deviation of the current sensor 72.

Because the SOC of the battery 70 is A (%) at time t1, the controller 80 monitors whether the SOC decreases by the predetermined value D1(%). During then, the controller 80 integrates the control current value (current IB) of the current sensor 72. The controller 80 starts the process of determining whether there is an offset deviation when the value of the SOC has decreased by D1(%) from a selected SOC % lower than or equal to A (%).

The SOC of the battery 70 has decreased to a value below A (%) at time t1, so integration of the current IB is started; however, the SOC of the battery 70 has increased to a value above A (%) at time t2, so determination is suspended. At this time, the integrated value of the current IB is cleared.

The SOC of the battery 70 has decreased to a value below A (%) again at time t3, so integration of the current D3 is started again. At time t4, the SOC of the battery 70 has decreased by D1(%) from A (%) at which integration of current is started, so integration of the current IB completes and it is determined whether there is an offset deviation. A first interval for determining whether there is an offset deviation in the control current value of the current sensor 72 is from time t3 to time t4.

When the integrated value of the current IB is negative, a determination result based on the detected value of the current sensor 72 (first determination result) is that "the battery 70 is being charged". On the other hand, when the integrated value of the current IB is positive, a determination result based on the detected value of the current sensor 72 (first determination result) is that "the battery 70 is being discharged". At this time, the SOC has decreased by D1(%), so a determination result based on the SOC (second determination result) indicates that "the battery 70 is being discharged". When the first determination result and the second determination result coincide with each other, the control current value of the current sensor 72 is directly used, and further correction is not performed. On the other hand, when the first determination result and the second determination result do not coincide with each other, the control current value of the current sensor 72 is corrected such that the first determination result coincides with the second determination result.

At time t4, the integrated value of the current IB is once cleared with the end of the first determination, and integration of the current IB for the next determination is started.

At time t5, the SOC of the battery 70 has decreased by D1(%) from the SOC at time t4 at which integration is started (A-1(%)), so the integration completes and it is determined whether there is an offset deviation. A second interval for determining whether there is an offset deviation in the control current value of the current sensor 72 is from time t4 to time t5. During then, the SOC of the battery 70 once slightly increases but does not exceed the value (A-1 (%)) at the start of integration (time t4), so integration of the current IB is continued. Determination as to whether there is an offset deviation and correction based on a determination result are the same as those performed at time t4, so the description will not be repeated.

At time t5, the integrated value of the current IB is once cleared with the end of the second determination, and integration of the current IB for the next determination is started. However, the SOC of the battery 70, which has been decreasing, turns to an increase halfway, and, at time t6, the SOC is higher than the SOC (A-2(%)) at the start of integration (time t5). Accordingly, determination is suspended.

Subsequently, from time t6 to time t7, the SOC continues to increase, and the process of offset correction is not executed.

At time t7, the SOC of the battery 70 starts decreasing. Therefore, the controller 80 starts integration of the current IB and monitoring whether the SOC decreases by D1(%) from a selected SOC lower than or equal to A (%). Monitoring has been performed until time t8; however, a predetermined time that indicates time over has elapsed without a decrease in SOC by D1(%) from the SOC at time t7.

Therefore, at time t8, the controller 80 suspends determination as to whether there is an offset deviation. At time t8, the integrated value of the current IB is once cleared, and integration of the current IB for the next determination is started.

At time t9, the SOC has decreased by D1(%) from the SOC at time t8, so it is determined again whether there is an offset deviation, as well as the determination carried out at time t4 and time t5. When there is an offset deviation, offset correction is performed.

Next, the process of correcting the control current value of the current sensor 72 will be described with reference to the flowcharts. FIG. 5 is a flowchart for illustrating the process of correcting the control current value of the current sensor 72. FIG. 6 is a flowchart for illustrating the details of the process of determining whether there is an offset deviation of the current sensor in step S2 of FIG. 5.

The flowchart of FIG. 5 will be schematically illustrated. After the process is started, the process of determining whether to prohibit offset correction of the current sensor 72 is executed in step S11. Subsequently, in step S3, the process of determining whether there is an offset deviation in the control current value of the current sensor 72 is executed. In step S12, the process of determining whether to permit offset correction of the current sensor 72 is executed. In addition, in step S13, the process of determining whether to cancel offset correction of the current sensor 72 is executed. In step S9, the process of performing offset correction of the current sensor 72 is executed.

Hereinafter, the processes of the flowchart will be described in detail. As initial values just after startup of the vehicle, an offset correction permission flag is set to an off state, and an offset correction prohibition flag is also set to an off state.

Initially, in step S1, it is determined whether an offset correction prohibition condition is satisfied. When the offset correction prohibition condition is satisfied in step S1, the process proceeds to step S2, and the offset correction prohibition flag is set to an on state. In step S2, the offset correction permission flag is set to the off state.

In step S1, when any one of the following conditions A1) to A3) is satisfied, it is determined that the offset correction prohibition condition is satisfied.

A1) A cumulative time (for example, 3600 seconds) or longer has elapsed from permission of offset correction.
A2) While offset correction is permitted, the state where the maximum value of a battery cell voltage in a battery pack is higher than or equal to a predetermined voltage has continued for a predetermined time or longer.
A3) Offset correction is prohibited (the offset correction prohibition flag is set to the on state) during the current trip.

The above-described condition A1 prevents a situation that offset correction is repeatedly performed a number of times and, as a result, an offset correction value steeply changes. The condition A2 prevents a situation that the battery cell voltage becomes overvoltage. The condition A3 means that, once offset correction is prohibited, offset correction is not permitted again during the same trip. A trip includes such operations that a key is inserted in the vehicle (the vehicle system is started up) to cause the vehicle to travel, the vehicle is caused to complete traveling and then the key of the vehicle is taken out (the vehicle system is shut down).

The offset correction prohibition condition does not need to be any one of the above-described A1 to A3. For example, it may be determined that there is an offset error of the current sensor 72 when all the following conditions A11 and A12 are satisfied.

A11) The integrated value of the control current value (current IB) of the current sensor in a predetermined detection period is larger than or equal to a predetermined value.
A12) The SOC has decreased a predetermined amount or more in the predetermined detection period.

In step S1, when the offset correction prohibition condition is satisfied, the process proceeds to step S3. In step S3, the offset deviation determination process shown in FIG. 6 is executed.

Referring to FIG. 6, when the offset deviation determination process is executed, the controller 80 initially executes the process of calculating an integrated current value and the process of calculating an integrated time in step S21. The integrated current value is calculated by repeatedly adding the control current value (current IB) of the current sensor 72 at time intervals at which the flowcharts of FIG. 5 and FIG. 6 are executed. The integrated time is calculated by counting an elapsed time until the process of clearing the integrated time is executed in step S25 or step S28, and is used in determining time over at time t8 in FIG. 4.

Subsequently, in step S22, it is determined whether a voltage estimated SOC has decreased by the predetermined value D1 from an SOC reference value. The voltage estimated SOC is the SOC of the battery 70, represented by the ordinate axis of FIG. 4, and is mainly an SOC calculated based on the output of the voltage sensor 71. The predetermined value D1 is the amount of decrease for determining a determination end time at which it is determined whether the battery 70 is being charged or discharged based on the total of the integrated current value as shown in FIG. 4, and may be, for example, D1=1%. The SOC reference value is an initial SOC of a determination interval. For the determination interval t3 to t4, the SOC reference value is the SOC at time t3 (A (%) in the example of FIG. 4). For the determination interval t4 to t5, the SOC reference value is the SOC at time t4 (A-1(%) in the example of FIG. 4).

When it is determined in step S22 that the voltage estimated SOC has decreased by the predetermined value D1 from the SOC reference value (YES in S22), the process proceeds to step S23. On the other hand, when it is determined in step S22 that the voltage estimated SOC has not decreased by the predetermined value D1 from the SOC reference value (NO in S22), the process proceeds to step S26.

In step S23, it is determined whether the integrated current value calculated in step S21 indicates that the battery 70 is being charged. The controller 80 is allowed to determine that the battery 70 is being discharged when the integrated current value is larger than or equal to a threshold, and determine that the battery 70 is being charged when the integrated current value is smaller than the threshold. In a simple example, where the threshold is zero, the controller 80 is allowed to determine that the battery 70 is being charged when the sign of the integrated current value is minus. The threshold may be not necessarily zero and may be set to a value including an allowance.

When it is determined in step S23 that the integrated current value indicates that the battery 70 is being charged (YES in S23), the process proceeds to step S24, and an offset deviation determination flag is set to an on state. On the other hand, when it is determined in step S23 that the integrated current value does not indicate that the battery 70 is being charged (NO in S23), the process of step S24 is not executed, and the offset deviation determination flag remains in an off state.

After that, in step S25, the controller 80 clears the integrated current value and the integrated time, and updates the SOC reference value with the present voltage estimated SOC.

Subsequently, in step S26, the controller 80 determines whether the voltage estimated SOC becomes higher than the SOC reference value within the determination interval or the integrated time becomes longer than or equal to a predetermined value. When the voltage estimated SOC becomes higher than the SOC reference value within the determination interval or when the integrated time becomes longer than or equal to the predetermined value in step S26 (YES in S26), the process proceeds to step S27; otherwise, (NO in S26), the process proceeds to step S31.

In step S27, the offset deviation determination flag is set to the off state, and determination is suspended. In the waveform chart shown in FIG. 4, time t2, time t6 and time t8 correspond to suspending determination in this case. At time t2 or time t6, the voltage estimated SOC is higher than a corresponding one of the SOC reference values (A (%), A-2(%)), with the result, at time t8, the integrated time becomes longer than or equal to the predetermined value, that is, time over.

Subsequently, in step S28, the controller 80 clears the integrated current value and the integrated time, and updates the SOC reference value with the present voltage estimated SOC.

After that, in step S29, it is determined whether the SOC reference value has exceeded an upper limit value. The upper limit value of the SOC reference value is an initial value (in the waveform example of FIG. 4, A (%)). When it is determined in step S29 that the SOC reference value has exceeded the upper limit value (YES in S29), the process proceeds to step S30, and the controller 80 sets the SOC reference value to the upper limit value. For example, in the waveform of FIG. 4, from time t2 to time t3, as a result of an increase in the voltage estimated SOC in the determination interval, the SOC reference value is updated with the present voltage estimated SOC in step S28; however, it is determined in S29 that the voltage estimated SOC exceeds the upper limit value (A (%)), so the SOC reference value is set to the upper limit value (A (%)) in step S30.

On the other hand, in the waveform of FIG. 4, from time t6 to time t7 as well, as a result of an increase in the voltage estimated SOC in the determination interval, the SOC reference value is updated with the present voltage estimated SOC in step S28; however, the voltage estimated value has not exceeded the upper limit value yet, so, at time t7, the SOC reference value is set to the voltage estimated SOC at time t7.

Through the above-described processes, the offset deviation determination flag is determined, and, when the SOC reference value is updated, control is returned to the flowchart of FIG. 5 in step S31, and then the process of step S4 is executed.

Referring back to FIG. 5, in step S4, it is determined whether the offset deviation determination flag set in step S3 is set in the on state. When the offset deviation determination flag is set in the off state (NO in S4), control is returned to the main routine, and offset correction of the current sensor 72 is not executed (the offset correction value is not changed).

When the offset deviation determination flag is set in the on state in step S4, the process of setting the offset correction permission flag is executed in step S12. The fact that the offset correction permission flag is set in the on state indicates that update of the offset correction value that the controller 80 stores for the current sensor 72 is permitted. Initially, the process proceeds to step S5. In step S5, it is determined whether an offset correction permission condition is satisfied.

The offset correction permission condition is satisfied when all the following conditions B1) to B5) are satisfied.

B1) Offset correction is currently not permitted (the offset correction permission flag is in the off state) and offset correction is not prohibited (the offset correction prohibition flag is in the off state).

B2) An allowable output power Wout from the battery is smaller than or equal to a predetermined value.

B3) An allowable input power Win to the battery is larger than or equal to a predetermined value (where Win is indicated by a negative value).

B4) The voltage estimated SOC is lower than or equal to the initial SOC reference value (in the example of FIG. 4, A (%)).

B5) The minimum value of the cell temperature in the battery pack is lower than or equal to a predetermined value.

When it is determined in step S5 that the offset correction permission condition is satisfied (YES in S5), the process proceeds to step S6, and the offset correction permission flag is set to the on state. On the other hand, when it is determined in step S5 that the offset correction permission condition is not satisfied (NO in S5), the process of step S6 is not executed, and the offset correction permission flag is not changed.

Subsequently, in step S13, the process of determining whether to cancel offset correction is executed. Cancelling offset correction means not updating the correction value that the controller 80 stores for the current sensor 72. However, different from prohibition of offset correction in step S11, in the case of cancellation, offset correction is resumed when the cancellation condition is not satisfied any more even during the same trip. Initially, the process proceeds to step S7. In step S7, it is determined whether an offset correction cancellation condition is satisfied.

The offset correction cancellation condition is satisfied at the time when the voltage estimated SOC becomes higher than or equal to a predetermined value. In the waveform chart of FIG. 4, when the voltage estimated SOC exceeds SOC1 (for example, A (%)) at time t2, integration of the current IB is stopped, and determination as to whether there is an offset deviation is also suspended. This corresponds to cancellation of offset correction. In this case, when the voltage estimated SOC becomes lower than or equal to SOC1 again at time t3, the determination process is resumed even during the same trip.

In order to avoid frequent repetition of cancelling offset correction and resuming determination process, a determination threshold for resuming determination process may be set so as to be lower than a determination result for cancelling offset correction.

When it is determined in step S7 that the offset correction cancellation condition is satisfied (YES in S7), the process proceeds to step S8, the offset correction permission flag is set to the off state, and the offset deviation determination flag is also set to the off state. On the other hand, when it is determined in step S7 that the offset correction cancellation condition is not satisfied (NO in S7), the process of step S8 is not executed, and the offset correction permission flag and the offset deviation determination flag are not changed.

The offset correction permission flag is determined in step S12, and it is determined in step S13 whether to cancel offset correction. After that, the process proceeds to step S9, and it is determined whether to execute the offset correction execution process of step S10 based on the statuses of the offset correction permission flag and offset correction prohibition flag.

When the offset correction permission flag is set in the on state and the offset correction prohibition flag is set in the off state in step S9 (YES in S9), the process of step S10 is executed; otherwise (NO in S9), the process of step S10 is not executed.

In step S10, offset correction of the current sensor 72 is performed. That is, as described above, the process of correcting or updating the correction value that is stored in the controller 80 for the detected value of the current sensor 72 is executed. Specifically, when the process proceeds to step S10, offset correction is permitted, so a predetermined value δi is added to the offset correction value of the current sensor 72, which is stored in the controller 80. The predetermined value oi may be, for example, set to −0.4 A. As a result, the control current value shifts toward the discharge side.

After the correction value is determined in the flowchart of FIG. 5, the controller 80 determines the control current value in charge and discharge control over the battery 70 in the main routine based on the following mathematical expression described above, and executes the control.

Control current value=(Detected value of the current sensor 72)−(Offset correction value)

An upper limit value may be provided for the offset correction value of the above mathematical expression for the purpose of preventing an increase in offset correction amount without limit.

As described above, in the present embodiment, when the first determination result that is recognized based on the control current value of the current sensor 72 indicates that the battery 70 is being charged and the second determination result that is recognized based on a change in the SOC indicates that the battery 70 is being discharged, the controller 80 changes the offset correction value of the current sensor 72 such that the first determination result coincides with the second determination result. Where discharging is plus and charging is minus, the offset correction value is changed such that the control current value of the current sensor 72 is increased. Thus, it is possible to reduce the possibility of battery depletion or overcharging of the battery. In the above-described embodiment, offset correction of the current sensor 72, which is performed in the case where the SOC of the battery 70 is near the lower limit value and there is a concern about overdischarging, will be described. As an alternative embodiment, offset correction of the current sensor 72 in the case where the SOC of the battery 70 is near the upper limit value may be performed.

In this case, the process of the flowchart shown in FIG. 5 is basically the same and the offset deviation determination process is changed from FIG. 6 to FIG. 7.

FIG. 7 is a flowchart for illustrating offset deviation determination process according to the alternative embodiment. The processes of step S41 to step S51 in FIG. 7 respectively correspond to the processes of step S21 to step S31 in FIG. 6. For the sake of easy description, only the difference in each process will be described.

In step S42, "decreased" in step S22 is replaced with "increased". In step S43, "the battery 70 is being charged" in step S23 is replaced with "the battery 70 is being discharged". In step S46, "increased" in step S26 is replaced with "decreased". In step S49, "has exceeded the upper limit value" in step S29 is replaced with "has become lower than the lower limit value". In step S50, "upper limit value" in step S30 is replaced with "lower limit value". As for the other portions, the processes of step S41 to step S51 are respectively the same as the processes of step S21 to step S31, so the description will not be repeated.

In the alternative embodiment, the initial SOC reference value (in the example of FIG. 4, A (%)) in the process of the flowchart shown in FIG. 5 is replaced with a value close to a management upper limit value of the SOC.

By controlling in this way, in the alternative embodiment, when the charge/discharge power is small and the influence of an offset error is large, the offset error is repeatedly corrected, and the control current value of the current sensor 72 is updated.

Specifically, in a state where the SOC of the battery 70 is near a usage upper limit SOC or higher than or equal to the usage upper limit SOC, the current IB that is the control current value of the current sensor 72 has a plus sign and indicates that the battery 70 is being discharged, while an increase in the SOC of the battery 70 is detected. This condition is set as a trigger condition for executing offset correction process over the current sensor 72.

When the above-described trigger condition is satisfied, the controller 80 corrects the control current value of the current sensor 72 to a charge recognition side, that is, in a reducing direction. Correction at this time is performed by further adding the correction value δi to the present correction value that is stored in the internal memory of the controller 80 for the purpose of correcting the detected value of the current sensor 72. The correction value δi may be a predetermined value obtained based on the temperature characteristics of the current sensor 72 and current detection circuit. As an example, the correction value δi may be set to a fixed value close to zero like δi=+0.4(A).

In a state where there is no concern about overcharging of the battery 70, for example, when the SOC of the battery 70 has a sufficient allowance for the upper limit value, when the voltage of the battery 70 is lower than or equal to a predetermined value or when the battery temperature is higher than or equal to a predetermined value, the above-described correction may be not performed or the correction may be cancelled.

As described above, in the alternative embodiment to the present embodiment, when the first determination result that is recognized based on the control current value of the current sensor 72 indicates that the battery 70 is being discharged and the second determination result that is recognized based on a change in the SOC indicates that the battery 70 is being charged, the correction value of the current sensor 72 is changed such that the first determination result coincides with the second determination result. Where discharging is plus and charging is minus, the correction value is changed such that the control current value of the current sensor 72 is reduced. Thus, it is possible to reduce the possibility of overcharging of the battery 70.

Lastly, the present embodiment and the alternative embodiment to the present embodiment will be summarized with reference to FIG. 1, and the like, again. The power supply system for a vehicle according to the present embodiment and the alternative embodiment includes the battery 70, the current sensor 72, the voltage sensor 71, and the controller 80. The current sensor 72 detects the charge and discharge current of the battery 70. The voltage sensor 71 detects the voltage of the battery 70. The controller 80 controls charging and discharging of the battery 70 upon reception of the output of the current sensor 72 and the output of the voltage sensor 71. The controller 80 calculates a control current value for control by subtracting an offset value from a detected value of the current sensor 72. The controller 80 repeatedly calculates a first determination result and a second determination result. The first determination result is obtained by determining whether the battery 70 is being charged or discharged based on the control current value. The second determination result is obtained by determining whether the battery 70 is being charged or discharged based on a change in a remaining amount of charge (SOC) of the battery 70. The remaining amount of charge (SOC) is calculated based on the output of the voltage sensor 71. When the first determination result and the second determination result are different from each other, the controller 80 executes the process of changing the offset value of the current sensor 72 such that the first determination result coincides with the second determination result.

The remaining amount of charge (SOC) of the battery 70 is calculated based on the output of the voltage sensor 71, so, even when there is an offset error in the control current value of the current sensor 72, the remaining amount of charge (SOC) of the battery 70 mostly increases during charging and decreases during discharging. For this reason, when the second determination result determined based on a change in the SOC of the battery does not coincide with the first determination result determined based on the control current value of the current sensor 72, the controller 80 determines that there is an offset error in the control current value of the current sensor 72, and executes the process of changing the offset value that is used in correcting the offset error of the current sensor 72 such that the first determination result coincides with the second determination result.

The SOC may be calculated based on both the output of the voltage sensor 71 and the output of the current sensor 72. In this case as well, when the result obtained by determining whether the battery 70 is being charged or discharged based on only the output of the current sensor 72 does not coincide with the result obtained by determining whether the battery 70 is being charged or discharged based on a change in the SOC, there is a high possibility that correction of the offset error of the current sensor 72 is not correct. Therefore, by changing the offset value that is used in correcting the offset error, the controller 80 is allowed to correctly determine whether the battery 70 is being charged or discharged.

As shown in FIG. 4 to FIG. 6, the controller 80 may be configured to, when the SOC of the battery 70 is higher than a predetermined value (SOC1 in FIG. 4), not execute the process of changing the offset value, and, when the SOC of the battery 70 is lower than the predetermined value, execute the process of changing the offset value.

By executing the above-described control, the offset value is changed only when the SOC of the battery 70 is close to a management lower limit value and the offset error of the current sensor 72 leads to overdischarging. For this reason, unnecessary correction process is omitted, so a slow processing speed of the controller 80 is prevented.

As shown in the example described with reference to FIG. 5 and FIG. 6, it is assumed that the first determination result indicates that the battery 70 is being charged (YES in S23) and the second determination result indicates that the battery 70 is being discharged (YES in S22). In this case, the controller 80 may be configured to, as long as the offset correction permission condition is satisfied (YES in S5) as a result of setting the offset determination flag to the on state and the offset correction cancellation condition is not satisfied (NO in S7), change the offset value of the current sensor 72 such that a predetermined charging current value is reduced (in a plus direction where the discharge side is plus) (S10).

By executing control as described above, the first determination result changes so as to indicate that the battery 70 is being discharged, so the detected value of the current sensor 72 is corrected to a correct side.

The controller 80 may be configured to, when the SOC of the battery 70 is lower than a predetermined value, not execute the process of changing the offset value, and, when the SOC of the battery 70 is higher than the predetermined value, execute the process of changing the offset value.

By executing control as described above, the offset value is changed only when the SOC of the battery 70 is close to a management upper limit value and the offset error of the current sensor 72 leads to overcharging. For this reason, unnecessary correction process is omitted, so a slow processing speed of the controller 80 is prevented.

As shown in the example described with reference to FIG. 5 and FIG. 7, it is assumed that the first determination result indicates that the battery 70 is being discharged (YES in S43) and the second determination result indicates that the battery 70 is being charged (YES in S42). In this case, as long as the offset correction permission condition is satisfied (YES in S5) as a result of setting the offset determination flag to the on state and the offset correction cancellation condition is not satisfied (NO in S7), the controller 80 changes the offset value of the current sensor 72 such that the discharge current value is reduced (in a minus direction where the discharge side is plus) (S10).

By executing control as described above, the first determination result changes so as to indicate that the battery 70 is being charged, and the detected value of the current sensor 72 is corrected to a correct side.

The present embodiment is summarized. The power supply system for a vehicle includes the battery 70, the current sensor 72, the voltage sensor 71, and the controller 80 that controls charging and discharging of the battery 70 upon reception of the output of the current sensor 72 and the output of the voltage sensor 71. The controller 80 calculates the control current value for control by subtracting the offset value from the detected value of the current sensor 72. The controller 80 calculates the first determination result and the second determination result. The first determination result is obtained by determining whether the battery 70 is being charged or discharged based on the control current value. The second determination result is obtained by determining whether the battery 70 is being charged or discharged based on a change in the remaining amount of charge (SOC) of the battery 70. The remaining amount of charge (SOC) is calculated based on the output of the voltage sensor 71. When the first determination result and the second determination result are different from each other, the controller 80 executes the process of changing the offset value of the current sensor 72 such that the first determination result coincides with the second determination result.

The processes shown in FIG. 5 to FIG. 7 according to the present embodiment are only illustrative. Flags are not necessarily used. Control over offset correction may be variously modified. In the present embodiment, the example in which the disclosure is applied to the hybrid vehicle is described; however, the vehicle is not limited to the hybrid vehicle. As long as a vehicle includes a battery and calculates the SOC of the battery, the disclosure is applicable to various vehicles (non-HV engine-driven vehicle, electric vehicle, fuel-cell vehicle, and the like).

The embodiment described above should be regarded as only illustrative in every respect and not restrictive. The scope of the disclosure is defined by the appended claims rather than the above description of the embodiment. The scope of the disclosure is intended to encompass all modifications within the scope of the appended claims and equivalents thereof.

What is claimed is:

1. A power supply system for a vehicle, the power supply system comprising:
   an electrical storage device;
   a current sensor configured to detect a charge current and a discharge current of the electrical storage device;
   a voltage sensor configured to detect a voltage of the electrical storage device; and
   a controller configured to
   a) control charging and discharging of the electrical storage device upon reception of an output of the current sensor and an output of the voltage sensor,
   b) calculate a control current value by subtracting an offset value from a detected value of the current sensor, the control current value being a value that is used in control that is executed by the controller,
   c) calculate a first determination result and a second determination result, the first determination result being obtained by determining whether the electrical storage device is being charged or discharged based on the control current value, the second determination result being obtained by determining whether the electrical storage device is being charged or discharged based on a change in a remaining amount of charge of the electrical storage device, the remaining amount of charge being calculated based on the output of the voltage sensor, and
   d) when the first determination result and the second determination result differ from each other, execute a process of changing the offset value such that the first determination result coincides with the second determination result.

2. The power supply system according to claim 1, wherein the controller is configured not to execute the process of changing the offset value when the remaining amount of charge of the electrical storage device is higher than a predetermined value, and
   the controller is configured to execute the process of changing the offset value when the remaining amount of charge of the electrical storage device is lower than the predetermined value.

3. The power supply system according to claim 1, wherein the controller is configured to, when the first determination result indicates that the electrical storage device is being charged and the second determination result indicates that the electrical storage device is being discharged, change the offset value such that a charge current value is reduced.

4. The power supply system according to claim 1, wherein the controller is configured not to execute the process of changing the offset value when the remaining amount of charge of the electrical storage device is lower than a predetermined value, and
   the controller is configured to execute the process of changing the offset value when the remaining amount of charge of the electrical storage device is higher than the predetermined value.

5. The power supply system according to claim 1, wherein the controller is configured to, when the first determination result indicates that the electrical storage device is being discharged and the second determination result indicates that the electrical storage device is being charged, change the offset value such that a discharge current value is reduced.

* * * * *